United States Patent [19]

Coassin et al.

[11] Patent Number: 5,542,165
[45] Date of Patent: Aug. 6, 1996

[54] LINE TO PRODUCE STRIP AND/OR SHEET

[75] Inventors: Giovanni Coassin, Pordenone; Bruno Di Giusto, Udine; Fausto Drigani, Zugliano; Pietro Morasca, Fresonara, all of Italy

[73] Assignee: Danieli & C. Officine Meccaniche SpA, Buttrio, Italy

[21] Appl. No.: 238,057

[22] Filed: May 4, 1994

[30] Foreign Application Priority Data

May 17, 1993 [IT] Italy .................. UD93A0086
Oct. 29, 1993 [IT] Italy .................. UD93A0215

[51] Int. Cl.⁶ .................. B21B 1/46; B21B 13/22
[52] U.S. Cl. .................. 29/33 C; 29/527.7; 164/417
[58] Field of Search .................. 164/417, 476, 164/477; 29/33 C, 527.7

[56] References Cited

U.S. PATENT DOCUMENTS

| | | | |
|---|---|---|---|
| 3,610,315 | 10/1971 | Juergens et al. | 164/476 |
| 4,217,095 | 8/1980 | Tokitsu | 164/476 X |
| 4,658,882 | 4/1987 | Oba et al. | |
| 5,014,412 | 5/1991 | Nobis et al. | 29/527.7 |
| 5,156,800 | 10/1992 | Buchet et al. | |
| 5,182,847 | 2/1993 | Guse et al. | 29/33 C X |
| 5,276,952 | 1/1994 | Thomas et al. | 29/33 C X |

FOREIGN PATENT DOCUMENTS

| | | |
|---|---|---|
| 0320846 | 6/1989 | European Pat. Off. . |
| 0353487 | 2/1990 | European Pat. Off. . |
| 0499851 | 8/1992 | European Pat. Off. . |
| 0610028 | 8/1994 | European Pat. Off. . |
| 3525457 | 1/1987 | Germany . |
| 4133898 | 4/1993 | Germany .................. 164/477 |
| 59-229268 | 12/1984 | Japan .................. 164/477 |
| 60-18201 | 1/1985 | Japan . |
| 60-96302 | 5/1985 | Japan .................. 29/527.7 |
| 61-67549 | 4/1986 | Japan .................. 164/476 |
| 62-89501 | 4/1987 | Japan .................. 29/527.7 |
| 3-180259 | 8/1991 | Japan .................. 164/417 |

OTHER PUBLICATIONS

Steel Times International, Incorporation Iron & Steel, vol. 17 No. 1 Jan. 1993, RedHill, Surrey, GM "Who's Doing what in Thin Slab Casting?".
Patent Abstracts of Japan, vol. 9, No. 135 (M–386) 11 Jun. 1985 & JP A 60 018 201 (Nippon Kokan) 30 Jan. 1985.

*Primary Examiner*—J. Reed Batten, Jr.
*Attorney, Agent, or Firm*—Antonelli, Terry, Stout & Kraus

[57] ABSTRACT

Line to produce strip and/or sheet or a combined line for strip/sheet, starting from at least one plant for the continuous casting of thin or medium slabs, the continuous casting plant comprising in sequence a continuous casting machine (12), at least one assembly (13) for shearing to size, a temperature restoration system, a rolling train (17– 117) and a possible assembly (19) for the cooling of strip/sheet. A device to accelerate the speed of feed of the slabs is included downstream of the assembly (13) for shearing to size. The temperature-restoration system includes an induction furnace (14) with at least one working frequency to heat the surface and edges of the slabs, the induction furnace (14) being followed by a low-speed descaler (115) and by a tunnel furnace (16). An emergency shears (24) and high-speed descaler (15) is included between the tunnel furnace (16) and the rolling train (17–117).

25 Claims, 3 Drawing Sheets

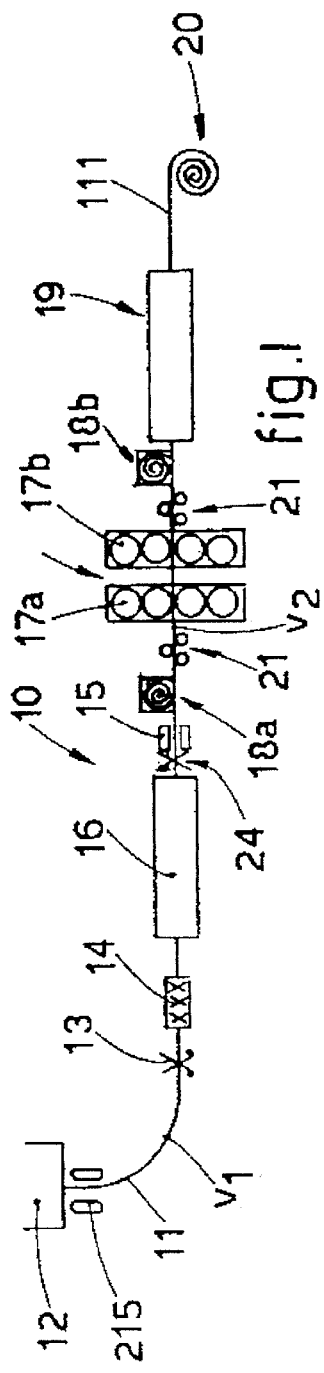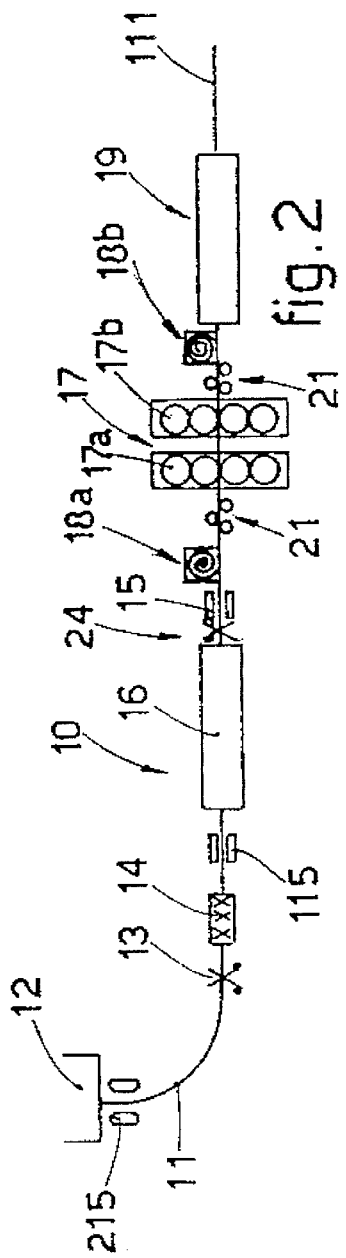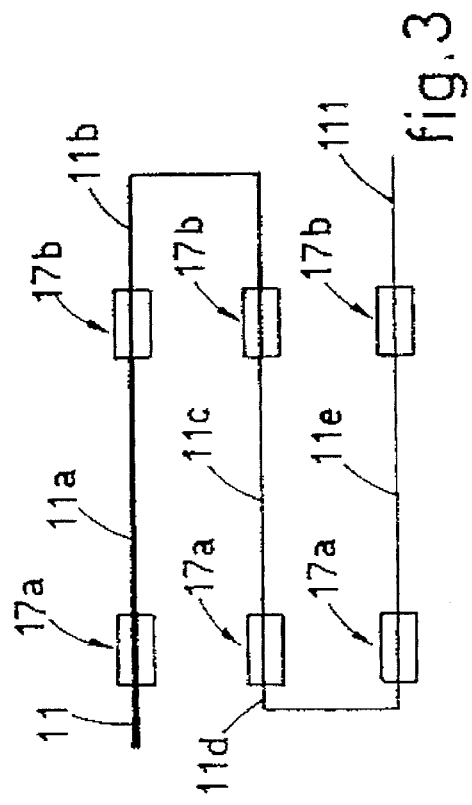

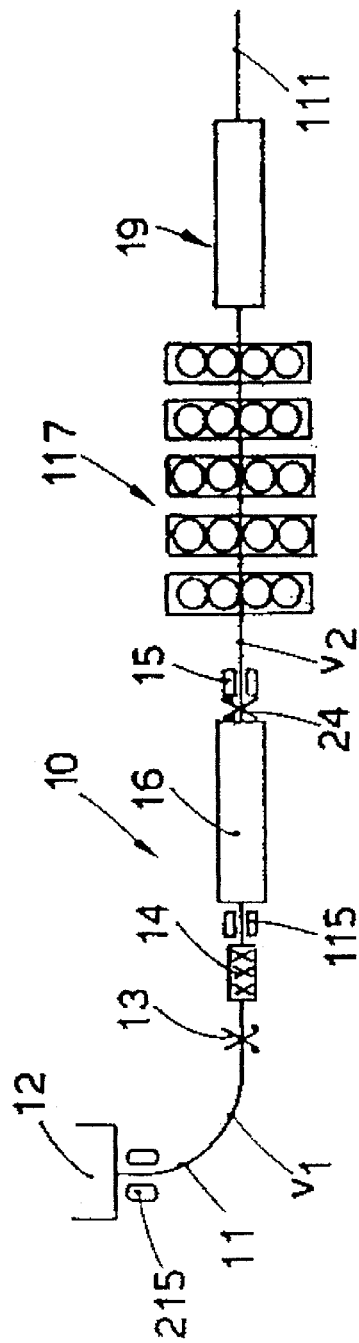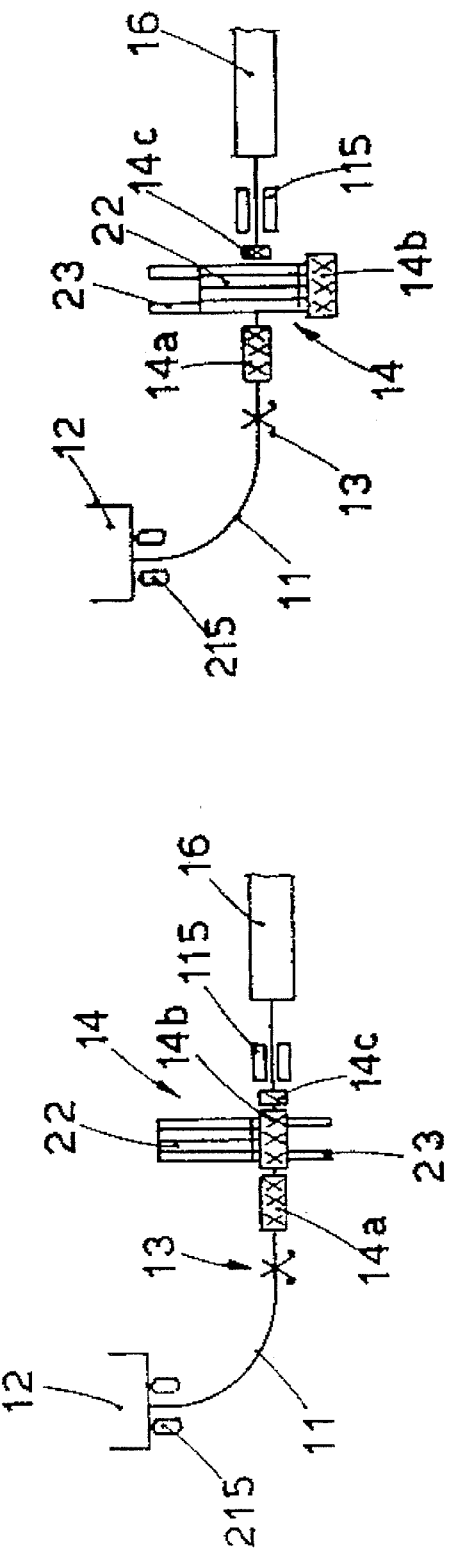

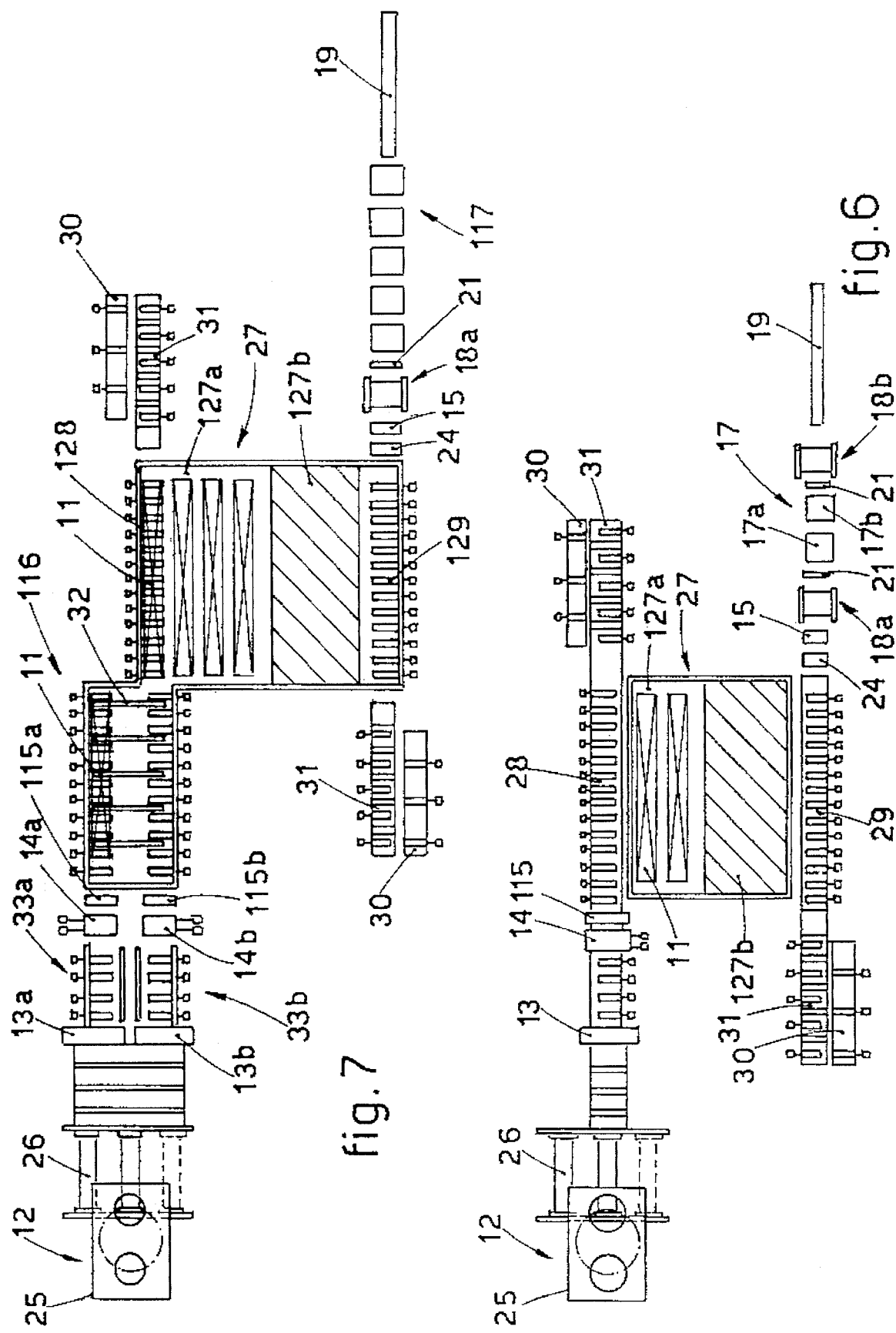

LINE TO PRODUCE STRIP AND/OR SHEET

BACKGROUND OF THE INVENTION

This invention concerns a line to produce strip and/or sheet.

To be more exact, the production line according to the invention is suitable for the balancing of the various components and for optimising the yield of a production plant for the rolling in line of strip and/or sheet, starting from the continuous casting of thin or medium slabs, and also for ensuring a high level of output.

By thin slabs are meant slabs with a width of 700 to 2500 mm. and with a thickness of 30 to 60 mm., whereas by medium slabs are meant slabs with a width of 700 to 2500 mm. and with a thickness of 60 to 130 mm.

Rolling lines to produce thin and medium strip or sheet are disclosed in the state of the art; the types usually employed in the state of the art are substantially two in number.

A first type of line arranges that the continuously cast slab, after being sheared to size, is sent into a temperature-restoration furnace of a combustion type.

The slab passing through this temperature-restoration furnace at a low speed has to stay therewithin until the temperature of the material has been brought to the necessary value most suitable for the subsequent processes.

This method entails the use of furnaces of great sizes up to 150 meters or more together with problems linked to the costs of investment, the power employed for heating, maintenance of the plant and also with problems connected with an imperfect productivity of the plant.

The segment of slab at the outlet of the combustion furnace is accelerated and then sent for rolling.

A second type of plant, such as those of EP-A-0107991 or U.S. application Ser. No. 5,156,800 for instance, provides a quick-heating assembly, an induction furnace for example, located downstream of the continuous casting plant and of the shearing-to-size assembly and followed by a furnace which makes homogeneous and equal the temperature of the slab.

The slab is passed at a low speed through the induction furnace so as to limit the requirement of power and is sent thereafter to a rolling train located at the outlet of the quick-heating assembly.

The rolling train works at a low speed with problems of thermal stress of the rolling rolls.

This requires the use of a rolling train oversized as compared to the other components of the plant.

This entails also an imperfect exploitation of the working assemblies of the production line.

The present applicants have designed, tested and embodied this invention to overcome the shortcomings of the state of the art and to achieve further advantages.

SUMMARY OF THE INVENTION

A purpose of the invention is to set up a line to produce sheet or strip which enables an excellent balance between all the components to be achieved, does not create imbalances and/or oversizing as between the operational assemblies involved and reduces the working times.

Another purpose of the invention is to provide a production line of a restricted size which, in particular, enables the length of the temperature-restoration furnace to be reduced.

A further purpose is to reduce the number and sizes of the rolling mill stands.

Yet another purpose of the invention is to reduce the power requirement in question.

Still another purpose of the invention is to make possible the doubling of the casting line without thereby entailing considerable work, high costs and a long downtime of the rolling train.

The production line according to the invention includes downstream of the continuous casting machine an assembly for shearing to size which shears the slab into segments of a required length, which is typically 40–50 meters.

The initial thickness of the slab leaving the casting machine is substantially between 30 and 150 mm.

The invention arranges that a pendulous mechanical shears is used as a shearing assembly for slabs between 30 and 80 mm. thick, whereas for greater thicknesses the shearing assembly consists of an assembly of oxygen cutting lances.

An induction furnace suitable to restore the temperature of the slab quickly is included immediately downstream of the shearing assembly.

The slab at the inlet of the induction furnace has a speed of feed corresponding to the casting speed, typically about 3 to 6 meters per minute.

At this low speed of feed the restoration of the temperature of the slab is achieved with an induction furnace of a modest length, which employs induction powers that may reach 16–18 MW when the casting speed reaches 6 meters per minute.

In a first lay-out of the invention the induction furnace has substantially the task of heating the surface and edges of the slab and in that case is followed by a heating furnace.

According to another lay-out of the invention the induction furnace has the task also of heating the slab in depth and may be designed to work with different frequencies related specifically to the surface and core of of the slab.

According to a further lay-out the induction furnace comprises a plurality of modules, of which at least one heats the surface and edges and at least one heats the slab in depth.

A tunnel furnace is included downstream of the induction furnace and may have either the task of preventing any fall in the temperature of the slab and of keeping the temperature at the values of its departure from the induction furnace or the task of heating the slab to the desired temperature.

When the shearing of the slab is signalled, the segment of slab is accelerated by increasing the speed of the roller conveyors to reach a speed of 40 to 60 meters per minute or more.

The roller conveyors can be inside the tunnel furnace or be outside and be associated with insulating hoods possibly equipped with heating means.

The increase of speed on the roller conveyors enables the trailing end of the sheared segment of slab to be distanced from the leading end of the next slab being cast.

According to a first lay-out the segment of slab undergoes a descaling process downstream of the tunnel furnace on its path to the rolling train.

According to a variant a descaling assembly is included upstream, or also upstream, of the tunnel furnace and immediately downstream of the induction furnace so as to make maximum use of the effect of cracking of the scale caused by the heating of the surface of the slab.

The descaling assembly is advantageously of a type with movable nozzles to reduce to a minimum the lowering of the temperature of the slab passing at a low speed.

Moreover, the descaling assembly may also be governed advantageously by the signal of the shearing of the slab, for instance by following the gradient of acceleration of the conveyor rollers of the furnaces and by thus optimising its descaling action.

According to a variant the descaling assembly is of a type with stationary nozzles.

The descaling assembly with rotary nozzles is located advantageously downstream of the induction furnace, whereas the descaling assembly with stationary nozzles is positioned upstream of the rolling train and downstream of the tunnel furnace, whether the latter be a heating furnace or a temperature maintaining furnace.

According to another variant a descaling assembly, which is advantageously, but not necessarily, of a type with movable nozzles, is included within the secondary cooling chamber of the casting plant or immediately outside the mould.

According to a variant a slab storage and traversing furnace having also the task of heating is comprised downstream of the induction furnace and descaling assembly.

According to the invention this storage and traversing furnace includes means to displace slabs in a direction crosswise to their normal direction of feed.

The storage and traversing furnace may have the task of connecting together a continuous casting machine and a rolling train which are not in the same line as each other.

The storage and traversing furnace may also act as a buffer store and emergency store when any accidents, obstacles, operations of maintenance or replacement of rolls halt the rolling train while the casting machine continues working.

Moreover, the storage and traversing furnace can be associated with stores holding a cold charge and/or special products to be forwarded for rolling.

A further task of the storage and traversing furnace can be the alternative connection of two continuous casting machines with one single rolling train.

The storage and traversing furnace comprises also at least one feeder roller conveyor associated with the casting machine and also at least one removal roller conveyor associated with the rolling train.

The feeder and removal roller conveyors are outside the storage and traversing furnace and cooperate therewith transversely for the transfer of slabs thereinto and therefrom.

According to a variant the feeder and removal roller conveyors are inside the furnace and cooperate lengthwise with the furnace for the entry of slabs.

According to a variant the storage and traversing furnace comprises a zone in which it performs the task of a heating furnace. This zone is advantageously the zone cooperating with the removal roller conveyor.

The rolling assembly may be of a reversible type with a double rolling mill stand, the rolling rolls being adjustable according to the reduction of thickness desired.

When strip is being produced, the reversible rolling assembly cooperates upstream and downstream with a winding/unwinding means on which the strip is respectively wound and unwound on leaving the rolling mill stands so as to enable the direction of feed to be inverted with a saving of the space occupied.

The winding/unwinding means may be of a type providing heating for the wound package.

When sheet is being produced, the winding/unwinding means are disactuated.

When the required finished thickness has been reached, the strip or sheet is sent to a cooling assembly and is then discharged from the line.

When strip is being produced, a unit to form packages is included downstream of the cooling assembly.

According to a variant the rolling assembly is of a continuous type and consists of 3 to 7 rolling mill stands arranged in line.

BRIEF DESCRIPTION OF THE DRAWINGS

The attached figures are given as a non-restrictive example and show some preferred lay-outs of the invention as follows:

FIG. 1 is a diagram of a strip production line according to the invention;

FIG. 2 is the production line of FIG. 1 as used for the production of sheet;

FIG. 3 is a diagram of the method of working of the rolling assembly;

FIG. 4 is a variant of the production line of FIG. 2;

FIGS. 5a and 5b show a variant of the production line of FIG. 4 in two working steps;

FIG. 6 is a plan view of a variant of the production line of FIG. 4;

FIG. 7 is a plan view of a variant of the production line of FIG. 6.

DETAILED DESCRIPTION OF THE PREFERRED EMBODIMENTS

The reference number 10 in the attached figures denotes a line to produce rolled products according to the invention.

FIG. 1 shows in particular a line 10 suitable to produce strip, whereas FIGS. 2 and 4 shows the line 10 as adapted to produce thin sheet.

A thin slab 11 coming from a continuous casting machine 12 is sent to a shearing assembly 13 consisting, for instance, of a pendulous shears for shearing to size or a shearing assembly of oxygen cutting lances, depending on the thickness of the cast slab 11.

The shearing assembly 13 is of a known type and is synchronised with the casting speed.

As shown in FIGS. 6 and 7 the continuous casting machine 12 includes a usual ladle-overturning unit 25 and tundishes 26 of a replaceable type of the state of the art.

During the production cycle the shearing assembly 13 shears the thin slab 11 into segments of a desired length related to the weight of the finished coil, but typically segments 40 to 50 meters long. The shearing assembly 13 is also prepared for emergency scrap-shearing into short segments of a length between 200 and 450 mm. and for discharge of the same or for shearing to size in short segments of 3 to 4 meters during an emergency cycle in synchronisation with an emergency speed of the casting machine 12.

During the production cycle the segments are fed at the casting speed, which is typically a speed V1 of about 3 to 6 meters per minute, within an induction-type furnace 14.

By making use of the low speed of feed and the characteristics of the induction furnace 14, a modest power and a substantially short passage of the slab 11 within the induction furnace 14 are enough to raise the temperature of the slab 11. The induction furnace 14 typically has a length of 3 to 12 meters.

The induction furnace 14 employs also powers between about 3 and 8 MW for the slowest speeds of feed but may reach 16 to 18 MW for speeds of feed of about 6 meters per minute.

The induction furnace 14 has the task substantially of heating the surface and edges of the slab 11.

According to a variant an induction furnace 14 is included which has a length at least equal to that of the segment of slab 11 sheared to size and has the task of heating the slab 11 in depth.

According to another variant (FIGS. 5a and 5b) the induction furnace 14 consists of three modules positioned in sequence and consisting in this case of a stationary segment 14a, a traversable segment 14b and another stationary segment 14c for heating the surface and edges. The traversable segment 14b may be located, for instance, on a bogie cooperating with rails 23.

According to the invention a descaling assembly 115 is included at the outlet of the last segment 14c of the induction furnace 14 heating the surface and edges and cooperates with the slab 11 being fed at a low speed.

The descaling assembly 115 is advantageously of a type with rotary nozzles providing a high pressure of impact of about 7 to 9 kgs/cm$^2$ and a low overall rate of flow of water of about 200–500 liters per minute so as to reduce to a minimum the drop in temperature of the slab 11 passing through at a low speed between 2.8 and 6 meters per minute.

During the normal production cycle the traversable segment 14b of the induction furnace 14 is installed on the same axis as the casting line and rolling train 17–117.

During an emergency cycle, when the shearing assembly 13 performs emergency shearing into lengths of 3 to 4 meters of slab, the traversable segment 14b is removed from the production line 10; to be more exact, in this case, when the signal has been given that the last production shearing has been performed and that the trailing end of the slab has entered the descaling assembly 115, the traversable segment 14b of the induction furnace 14 is removed from the line and replaced by a transfer means 22.

This transfer means 22 is suitable to collect the short slabs of 3–4 meters prepared by the shearing assembly 13 during the emergency cycle.

A tunnel furnace 16 is included downstream of the induction furnace 14 and may have the function of a heating furnace when the induction furnace 14 has only the task of heating the surface and edges.

Instead, the tunnel furnace 16 may have the function of a temperature maintaining furnace when it cooperates with an induction furnace 14 that heats the surface of the slab 11 and also heats the slab 11 in depth. In this case the tunnel furnace 16, possibly heated and/or insulated, arranges to prevent any drop in temperature of the material and maintains and keeps equal that temperature at about the values at the outlet of the induction furnace 14.

That temperature maintaining furnace or tunnel 16 is so dimensioned that it contains the whole length of the segment of slab 11.

As soon as the trailing end of the slab 11 leaves the induction furnace 14, the segment of slab is accelerated up to a speed V2 of about 60 meters a minute, undergoes descaling by the high-speed descaling assembly 15 and is sent to the rolling train 17–117.

According to a variant at least one emergency shears 24 advantageously of a hydraulic type is located between the tunnel furnace 16 and the descaling assembly 15.

According to the invention the high-speed descaling assembly 15 is advantageously of a type with static nozzles and obtains a pressure of impact of about 4.5 to 8.5 kgs/cm$^2$.

According to a variant descaling assemblies 215 are included in direct cooperation with the secondary cooling chamber immediately downstream of the mould and possibly in cooperation with the base of the mould itself.

The variant shown in FIGS. 6 and 7 includes a storage and traversing furnace 27 downstream of the induction furnace 14. This storage and traversing furnace 27 cooperates with at least one feeder roller conveyor 28 associated with the casting machine 12 and at-least one removal roller conveyor 29 associated with the rolling train 17.

In the lay-out of FIG. 6 the storage and traversing furnace 27 has the task of connecting a casting machine 12 to a rolling train 17 which is not in-line with the casting machine 12.

The storage and traversing furnace 27 has the further function of a buffer store to collect segments of slab 11 whenever the rolling train 17–117 is halted owing to accidents, obstacles, operations of maintenance or replacement of rolls, etc.

The storage and traversing furnace 27 includes means to take slabs 11 from the feeder roller conveyor 28, transfer those slabs 11 crosswise to the normal direction of feed of the slabs 11 and place those slabs 11 on the removal roller conveyor 29.

These means to handle the slabs 11 within the storage and traversing furnace 27 are suitable to displace the slabs 11 transversely to the normal direction of feed of the slabs and are generally of a step-by-step known type.

According to the invention these handling means associated with the storage and traversing furnace 27 advantageously work in modest steps of the order of 500–600 mm. in displacing the slabs 11 within the storage and traversing furnace 27.

These handling means can also work with a greater step substantially equal to the width of the slab 11 in transferring the slab 11 from the feeder roller conveyor 28 and to the removal roller conveyor 29, the purpose of this being to carry out with one single displacement the taking of the slab 11 from the feeder roller conveyor 28 and the delivery of the same 11 to the removal roller conveyor 29.

In the lay-out of FIG. 6 the feeder 28 and removal 29 roller conveyors are outside the storage and traversing furnace 27 and the introduction of the slab 11 into the storage and traversing furnace 27 takes place in a direction crosswise to the lengthwise axis of the slabs 11.

According to a variant of the invention the storage and traversing furnace 27 includes a first zone 127a associated with the feeder roller conveyor 28 and acting as buffer store and/or emergency store for the rolling train 17 and a second zone 127b associated with the removal roller conveyor 29 and used for heating the slabs which have to be forwarded for the rolling process.

According to another variant the storage and traversing furnace 27 cooperates with stores 30 which hold a cold charge and/or special products and which are associated with roller conveyors 31 that deliver into the furnace; these stores 30 may also act as emergency stores.

These stores 30 for a cold charge and/or special products may cooperate with units that perform conditioning, cropping of the leading and/or trailing ends, re-finishing and quick heating.

In the variant of FIG. 7 the storage and traversing furnace 27 has the task of connecting two casting lines 33a and 33b respectively to one single rolling train 117.

In this case the storage and traversing furnace 27 is associated directly with a tunnel 116, which maintains the temperature of the slabs, possibly heats them and connects the side-by-side roller conveyors associated with the two casting lines 33a and 33b.

Each casting line 33a and 33b includes its relative shearing assembly 13a and 13b induction furnace 14a and 14b and descaling assembly 115a and 115b.

The tunnel 116 includes transfer means 32 to transfer the slabs from one casting line 33 to the other.

This lay-out makes possible the alternative working of the two casting lines 33, which can feed the storage and traversing furnace 27 substantially continuously.

In the lay-out of FIG. 7 the storage and traversing furnace 27 contains the feeder 128 and removal 129 roller conveyors within the furnace 27. The slabs 11 are fed into the furnace 27 along their normal axis of feed.

In the example of FIGS. 1, 2 and 6 the rolling assembly 17 is of a reversible two-stand type.

In a typical case of production of strip and/or sheet 111 with a finished thickness of about 1.5 to 2 mm. starting from a slab 11 cast with a thickness of about 50 mm., the sequence of reductions in the rolling assembly 17 is typically that shown in FIG. 3.

The first pass in the first rolling mill stand 17a brings the slab 11a to a thickness of about 25 mm.; the next pass in the second stand 17b reduces that thickness of slab 11b to about 14 mm.

Where strip is being produced, the strip leaving the second stand 17b is wound in a roll on a second winding/unwinding unit 18 located downstream of the second stand 17b.

Thereafter the direction of feed of the strip/sheet is inverted for a second pass through the rolling mill assembly 17.

This second pass through the second stand 17b brings the thickness of the slab 11c to a value of about 9 mm., while the pass through the first stand 17a reduces this thickness of slab 11d to a value of about 5 mm.

Where strip is being produced, in this step the first winding/unwinding unit 18a located upstream of the first rolling mill stand 17a performs winding of the strip.

The winding/unwinding units 18a–18b cooperate with drawing units 21.

Where sheet is being produced, the winding/unwinding units 18 are excluded from the line and the whole length of the sheet is passed from one side to the other side of the rolling assembly 17.

The direction of feed is now inverted again for a third pass of the strip/sheet through the rolling assembly 17.

In particular, this third pass through the first stand 17a reduces the thickness of the strip/sheet 11e to about 3 mm. and the third pass through the second stand 17b brings the strip/sheet to the desired finished value of thickness of about 1.5 mm.

Lastly, the strip/sheet 111 is sent to a cooling assembly 19 and is then discharged from the line 10.

When strip is being produced, a strip coiling unit 20 to form coiled packages is included downstream of the cooling assembly 19.

According to the variant of FIG. 4 the rolling assembly 117 is of a continuous type and comprises five rolling mill stands positioned in line.

We claim:

1. Line to produce at least one of strip and sheet starting from at least one plant for the continuous casting of thin or medium slabs, the continuous casting plant comprising in sequence a continuous casting machine, at least one assembly for shearing to size, a temperature restoration system, a rolling train, and means to accelerate the speed of feed of the slabs included downstream of the assembly for shearing to size, in which line the temperature-restoration system comprises an induction furnace with at least one working frequency to heat the surface and edges of the slabs, the induction furnace being followed by a low-speed descaling means and by a tunnel furnace, an emergency shears and high-speed descaling means being included between the tunnel furnace and the rolling train.

2. Line as in claim 1, in which the tunnel furnace comprises a storage and traversing furnace.

3. Line as in claim 2, in which the continuous casting machine serves two casting lines and the tunnel furnace comprises side-by-side roller conveyors associated with the two casting lines.

4. Line as in claim 3, which comprises means to connect and to transfer slabs between the two side-by-side roller conveyors of the two casting lines.

5. Line as in claim 2, in which the storage and traversing furnace has outside itself at least one of feeder and removal roller conveyors.

6. Line as in claim 2, in which the storage and traversing furnace contains within it feeder and removal roller conveyors.

7. Line as in claim 2, in which the storage and traversing furnace contains at least one zone for the collection of slabs.

8. Line as in claim 2, in which the storage and traversing furnace contains at least one zone for the heating of slabs.

9. Line as claim 2, in which the storage and traversing furnace cooperates with stores for at least one of a cold charge and/or special products.

10. Line as in claim 2, in which the storage and traversing furnace connects a casting line to the rolling train which is positioned offset from that casting line.

11. Line as in claim 3, in which the storage and traversing furnace connects the two casting lines to the rolling train which is positioned offset from the two casting lines.

12. Line as in claim 1, which includes descaling assemblies within a secondary cooling chamber, at least one of these descaling assemblies being directly in cooperation with the base of a mould of the continuous casting machine.

13. Line as in claim 1, in which the low-speed descaling means provide a pressure of impact of about 7–9 kgs/cm$^2$ and an overall rate of flow of water of about 200–500 liters per minute.

14. Line as in claim 13, in which the low-speed descaling means comprises rotary nozzles.

15. Line as in claim 1, in which the high-speed descaling means provide a pressure of impact of about 4.5–8.5 kgs/cm$^2$.

16. Line as in claim 15, in which the high-speed descaling means comprises static nozzles.

17. Line as in claim 1, in which the rolling train is discontinuous and consists of a reversible double stand with rolling rolls which can be adjusted on the basis of the reduction to be obtained, and cooperates with winding/unwinding means positioned upstream and downstream.

18. Line as in claim 1, in which the rolling train is continuous and includes from 3 to 7 rolling mill stands positioned in-line.

19. Line as in claim 1, in which the induction furnace is structured with a plurality of modules of which at least one performs heating of the edges of the slab.

20. Line as in claim 1, in which at least a part of the induction furnace can be removed from the line.

21. Line as in claim 20, in which at least in an emergency cycle the element of the induction furnace which can be removed is replaced in the line by a transfer means for recovery of short slabs.

22. Line as in claim 1, in which the increase of speed of the rolls in the induction furnace is started by a signal that the assembly for shearing to size has performed the shearing.

23. Line as in claim 1, further comprising an assembly for the cooling of strip/sheet included downstream of said rolling train.

24. Line as in claim 1, wherein the continuous casting machine casts slabs having a thickness between 30 and 150 mm.

25. Line as in claim 1, wherein the means to accelerate the speed of feed of the slabs is provided at a position upstream of the rolling train so as to accelerate the speed of feed of the slabs as soon as a trailing end of the slab leaves the induction furnace.

* * * * *